(12) United States Patent
Repetto et al.

(10) Patent No.: US 7,784,422 B2
(45) Date of Patent: Aug. 31, 2010

(54) SPEED-INDICATING INSTRUMENT FOR MOTOR VEHICLE PROVIDED WITH AN ADAPTIVE CRUISE-CONTROL SYSTEM

(75) Inventors: Piermario Repetto, Turin (IT); Stefano Bernard, Orbassano (IT)

(73) Assignee: C.R.F. Società Consortile per Azioni, Orbassano (Torino) (IT)

( * ) Notice: Subject to any disclaimer, the term of this patent is extended or adjusted under 35 U.S.C. 154(b) by 242 days.

(21) Appl. No.: 12/095,836

(22) PCT Filed: Aug. 3, 2007

(86) PCT No.: PCT/IB2007/002289
§ 371 (c)(1),
(2), (4) Date: Jun. 2, 2008

(87) PCT Pub. No.: WO2008/038078
PCT Pub. Date: Apr. 3, 2008

(65) Prior Publication Data
US 2008/0289564 A1   Nov. 27, 2008

(30) Foreign Application Priority Data
Sep. 27, 2006   (EP) ................... 06425664

(51) Int. Cl.
*G01D 13/00* (2006.01)
(52) U.S. Cl. .................... 116/62.4; 116/62.1
(58) Field of Classification Search ........... 116/62.4, 116/62.1, 284, 286, 287, 288, 28 R
See application file for complete search history.

(56) References Cited
U.S. PATENT DOCUMENTS
2,550,033 A * 4/1951 Adams ..................... 116/320
2,551,188 A * 5/1951 Wagner ..................... 40/495
2,794,413 A * 6/1957 Berger ...................... 116/298
2,828,625 A * 4/1958 Morphis et al. ............ 73/431

(Continued)

FOREIGN PATENT DOCUMENTS
DE    202 13 491    2/2003

(Continued)

OTHER PUBLICATIONS
International Search Report for PCT/IB2007/002289 mailed Jan. 9, 2008.

(Continued)

*Primary Examiner*—R. A. Smith
*Assistant Examiner*—Tania C Courson
(74) *Attorney, Agent, or Firm*—Nixon & Vanderhye P.C.

(57) ABSTRACT

A speed-indicating instrument for a motor vehicle provided with a cruise-control system comprises a dial (1) provided with a speed-indicating pointer (3) that co-operates with a graduated scale (5). Displayed in a position adjacent to the graduated scale (5) is an arc of light (6) terminating at one end (6a) that indicates on the graduated scale (5) the cruise-speed value set. Said arc of light is displayed using a first optical filter (7) and a second optical filter (8) superimposed on one another and backlighted, at least one of which being controlled in angular position about the centre (4) of the dial (1) as a function of the cruise speed set.

3 Claims, 5 Drawing Sheets

U.S. PATENT DOCUMENTS

| | | | | |
|---|---|---|---|---|
| 2,898,880 A * | 8/1959 | Newton, Jr. | | 116/288 |
| 4,890,572 A * | 1/1990 | Huang | | 116/298 |
| 6,456,569 B1 * | 9/2002 | Stauffer | | 368/236 |
| 6,811,278 B2 * | 11/2004 | Sung | | 362/84 |
| 6,922,139 B2 * | 7/2005 | Vågstedt | | 340/438 |
| 7,077,535 B2 * | 7/2006 | Wu | | 362/26 |
| 7,458,695 B2 * | 12/2008 | Birman et al. | | 362/26 |
| 7,549,390 B2 * | 6/2009 | Verdouw | | 116/288 |
| 2005/0279273 A1 * | 12/2005 | Pa | | 116/305 |
| 2007/0181055 A1 * | 8/2007 | Chou | | 116/286 |

FOREIGN PATENT DOCUMENTS

| | | |
|---|---|---|
| GB | 8 10 224 | 3/1959 |
| WO | 01/92047 | 12/2001 |

OTHER PUBLICATIONS

Written Opinion for PCT/IB2007/002289 mailed Jan. 9, 2008.

\* cited by examiner

SPEED-INDICATING INSTRUMENT FOR MOTOR VEHICLE PROVIDED WITH AN ADAPTIVE CRUISE-CONTROL SYSTEM

This application is the U.S. national phase of International Application No. PCT/IB2007/002289 filed 3 Aug. 2007 which designated the U.S. and claims priority to European Patent Application No. 06425664.7 filed 27 Sep. 2006, the entire contents of each of which are hereby incorporated by reference.

The present invention relates to a speed-indicating instrument for a motor vehicle provided with a cruise-control system, said instrument being of the type comprising:

a dial, provided with a speed-indicating pointer, which co-operates with a graduated scale extending circumferentially along at least part of the periphery of the dial; and a device for displaying, in a position adjacent to said graduated scale, an arc of light, whether continuous or dashed, substantially concentric with the dial and having an end in a position corresponding to the value on the graduated scale of the cruise speed set by means of the cruise-control system.

Indicating instruments of the type referred to above are known, in which the aforesaid arc of light can be displayed thanks to the pre-arrangement of an array of electronically controlled light sources, for example of the LED type. Said solution is relatively complicated and costly, above all in the case where it is desired that the cruise-speed display is sufficiently fine as to show even a minimal variation of said value, for example of the order of one kilometre per hour.

The purpose of the present invention is to provide an indicating instrument of the type referred to above that is substantially simpler and less expensive to produce as compared to known devices.

With a view to achieving said purpose, the subject of the present invention is an indicating instrument having the characteristics referred to at the start of the present description and further characterized in that the aforesaid device for displaying the aforesaid arc of light comprises a first optical filter and a second optical filter superimposed on one another and backlighted, at least one of which is driven in rotation about the centre of the dial as a function of the cruise speed set.

Thanks to the aforesaid characteristic, it is possible to build the indicating instrument according to the invention without any pre-arrangement of dedicated light sources and without the need for the corresponding electronic control system, the system according to the invention being basically a mechanical system, the rotating parts of which can be controlled by any type of electrical actuator, with simple and low-cost means.

Further specific characteristics of some preferred embodiments of the invention form the subject of the annexed dependent claims.

The invention will now be described with reference to the annexed plate of drawings, which is provided purely by way of non-limiting example and in which.

Figure 2:
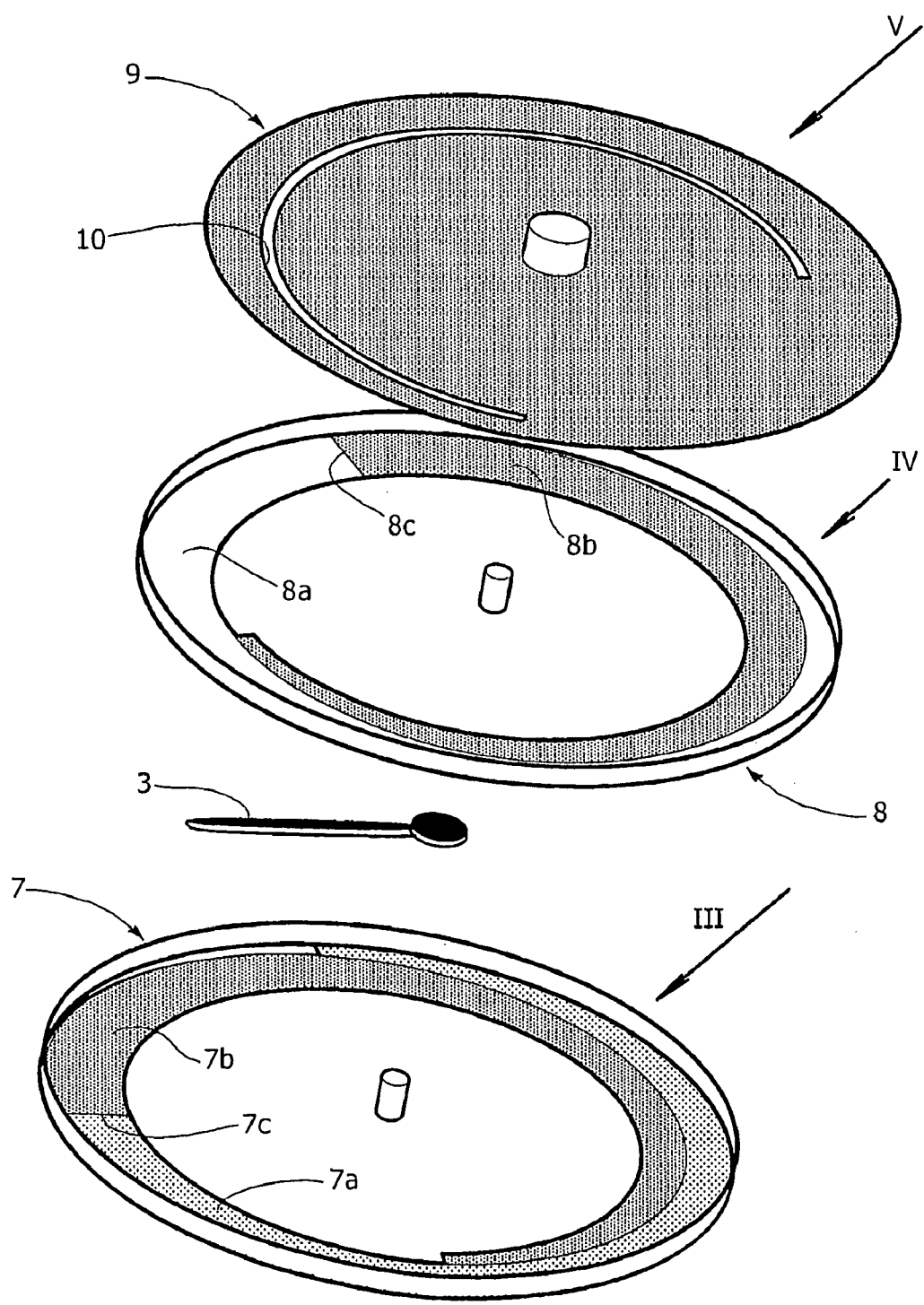
FIG. 2 is an exploded perspective view of a first embodiment of the indicator of FIG. 1.
Figure 3:
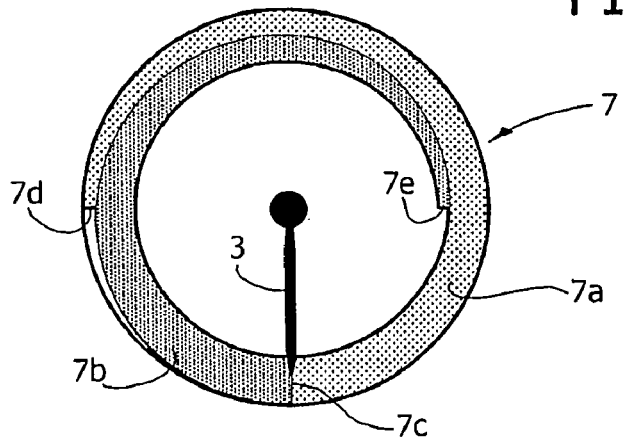
Figure 4:
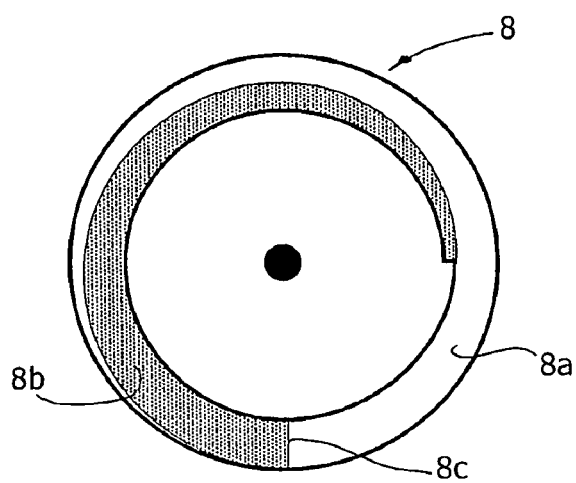
Figure 5:
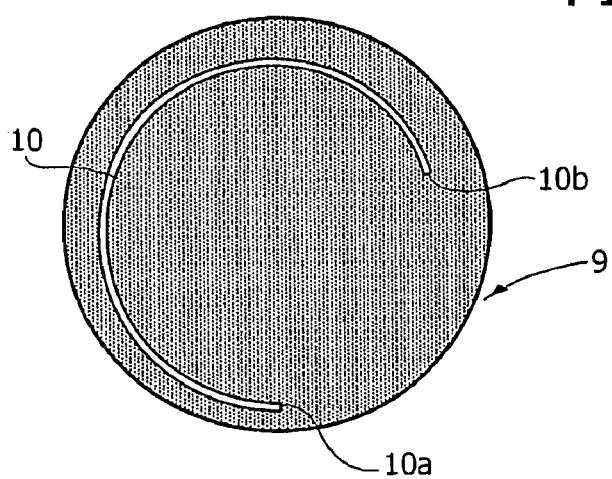
Figure 6:
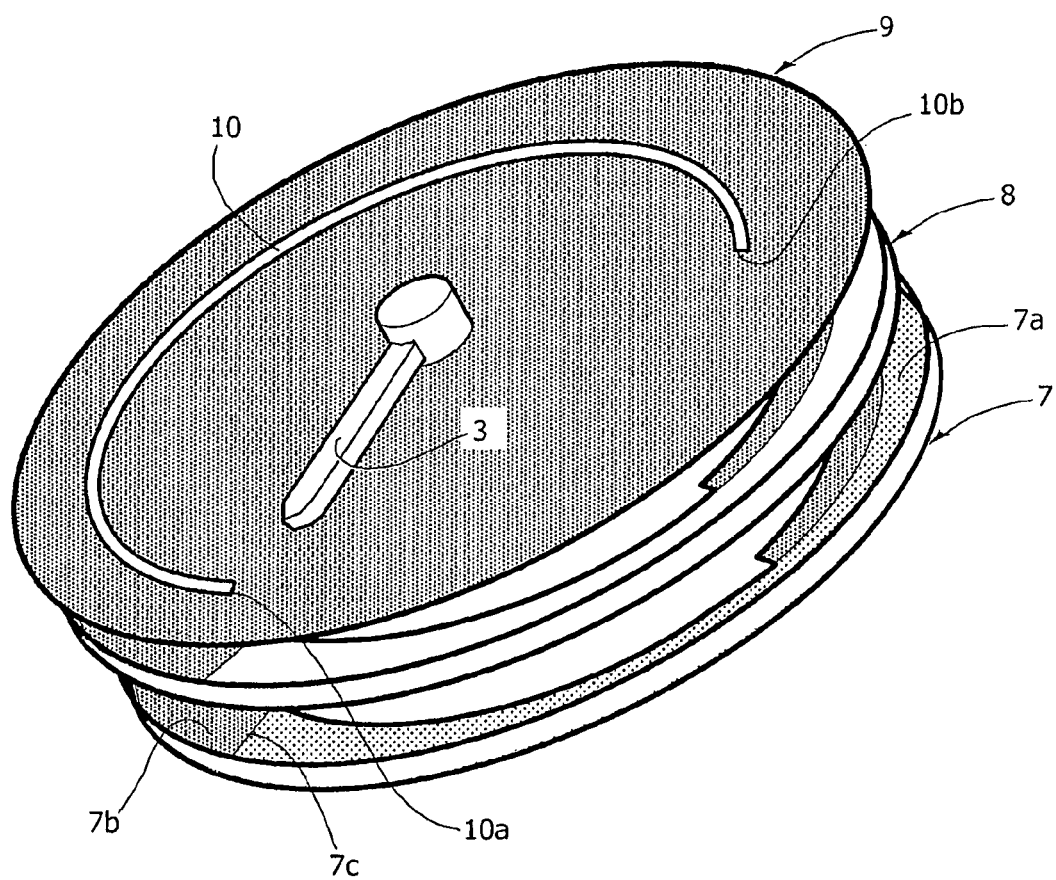

FIGS. 3, 4, and 5 are front views of the details indicated by the arrows III, IV and V in FIG. 2;

FIG. 6 is a further perspective view of the instrument of FIG. 2; and

Figure 7:
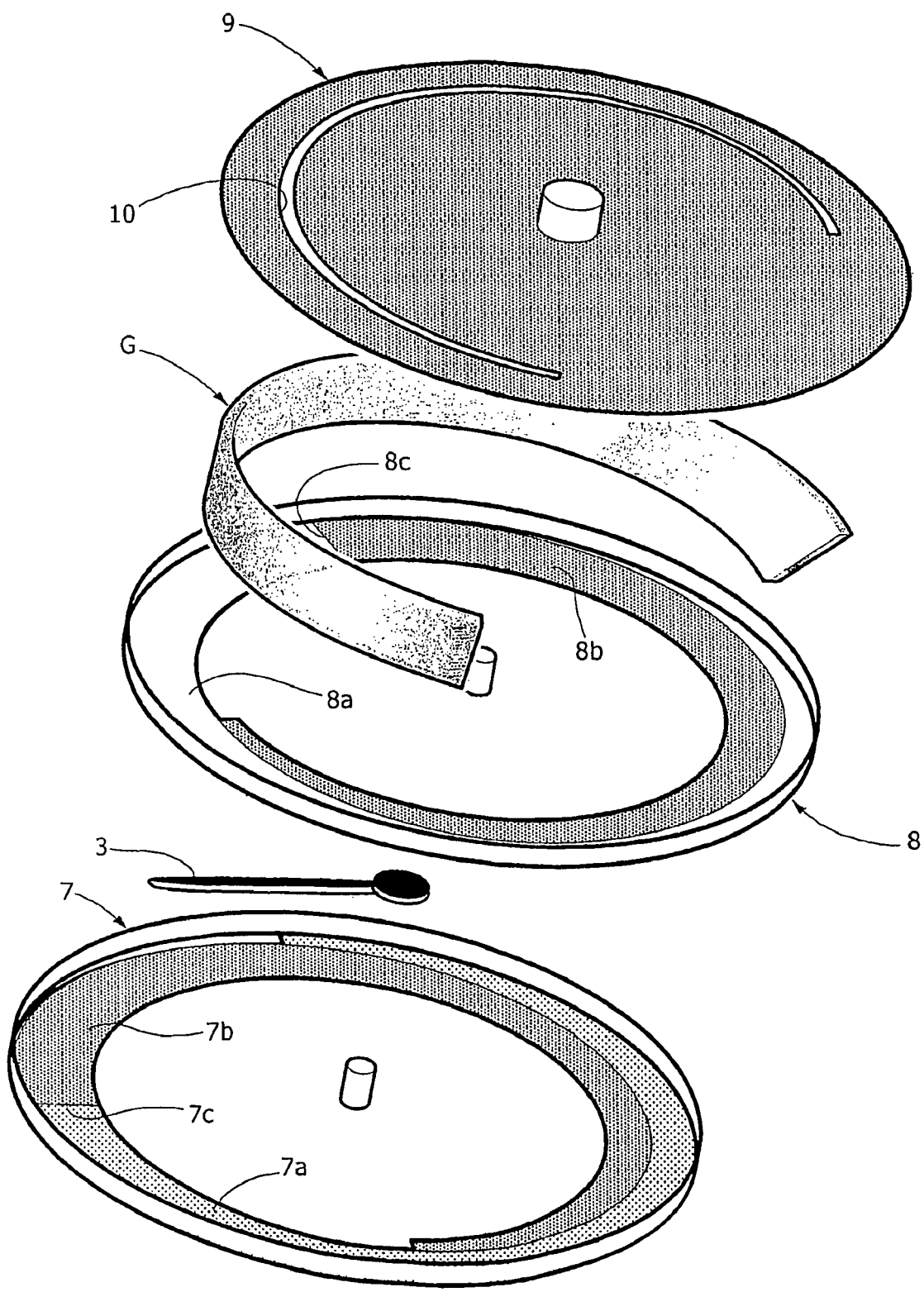

FIG. 7 is a variant of FIG. 2, which shows a preferred embodiment.

Figure 1:
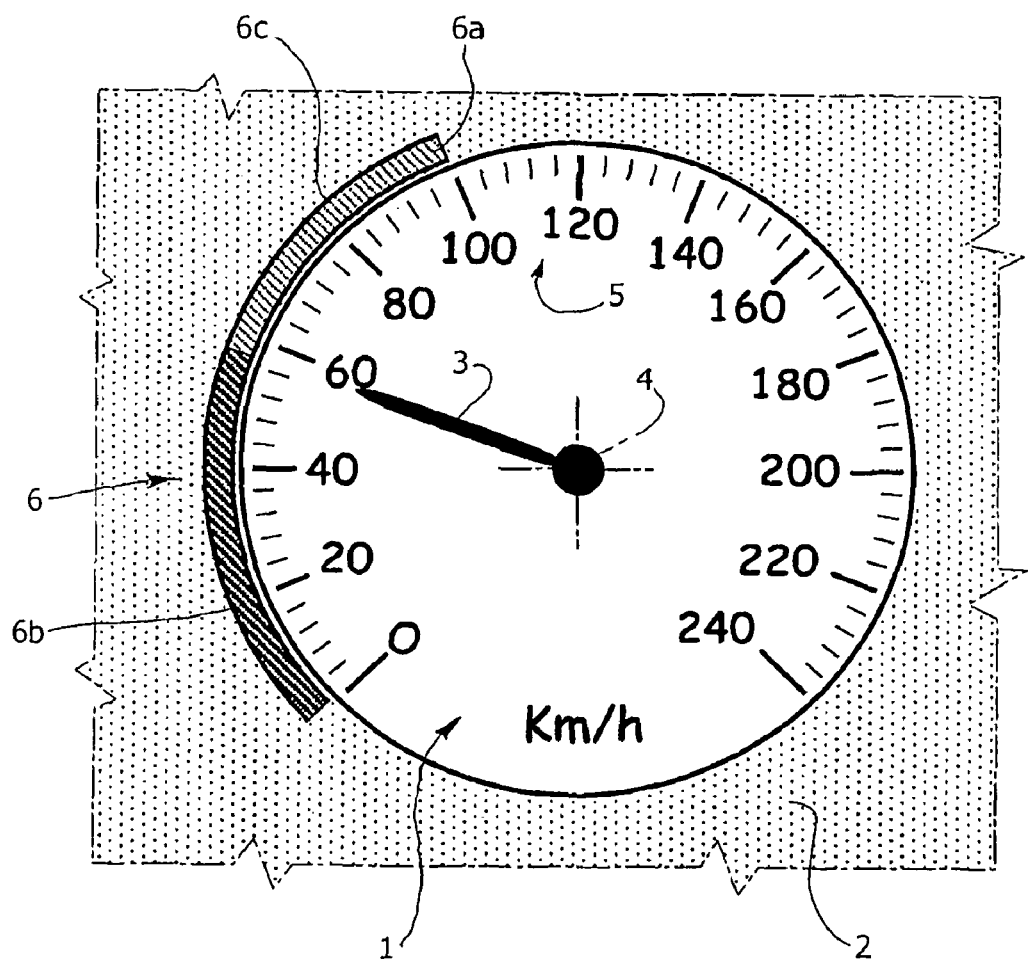
FIG. 1 is a schematic front view of an indicating instrument according to the invention.

With reference to FIG. 1, number 1 designates as a whole the dial of an indicating instrument for motor vehicles that can be for example integrated in the surface 2 of an instrument panel on the dashboard of a motor vehicle. The indicating instrument illustrated is designed to be used on a motor vehicle provided with an adaptive cruise-control system, in which the driver can set a desired cruise speed, which is then automatically maintained by the control system (even in the case of variations in the slope of the road) without the driver having to keep his foot on the accelerator pedal. In certain systems of this type the actual speed of the vehicle is automatically reduced in the presence of obstacles, for example, to keep a safety distance from a vehicle travelling in front, and increased again automatically up to the value set when said obstacles are no longer present.

The indicating instrument comprises a conventional indicator needle 3, which is able to rotate about a central axis 4 and co-operates with a graduated scale 5 extending along a part of the periphery of the dial 1 for indicating the actual speed of advance of the motor vehicle. In addition, the indicating instrument is able to display an arc of light 6, whether continuous or dashed, which is concentric with the dial and has one end 6a having the angular position of the point of the graduated scale 5 that indicates the value of the cruise speed set by the driver.

The example illustrated in FIG. 1 regards the case where the arc of light 6 is divided into two sections, one of which, designated by 6b, ranges from the value 0 of the graduated scale up to the value of the actual speed of the motor vehicle, and the other, designated by 6c, which ranges from the value of the actual speed of the motor vehicle up to the value of the cruise speed set. The two sectors 6b, 6c can be, for example, green and red, respectively. The arc of light 6 can be in the form of a solid strip, as may be seen in FIG. 1, or, according to an alternative solution, can be made up of a succession of dashes of light.

With reference to the embodiment illustrated in FIGS. 2-6, the dial 1 comprises a first optical filter and a second optical filter, designated, respectively, by 7 and 8, each of which is substantially in the form of a flattened ring. The two optical filters 7, 8 are set on top of one another, are concentric to one another, and share the central axis 4 of the dial with their flat sides set orthogonal to said axis. The filters 7, 8 are backlighted, i.e., lighted on the side opposite to the one facing the driver, by means of a light source of any known type (not illustrated in the plate of drawings).

In the example illustrated, the first optical filter 7 has its area divided into two sub-areas 7a, 7b, of different colours, for example green and red, respectively. As is clearly visible in FIG. 3, the two sub-areas 7a, 7b have adjacent ends having a maximum width in a position corresponding to a point 7c of the optical filter 7 that is always maintained (in the way that will be described in detail in what follows) in the same angular position as that of the indicator needle 3. Once again with reference to the example illustrated, starting from the end 7c, the sub-area 7a develops in a counterclockwise direction progressively decreasing in width up to an end tip 7d. Likewise, the sub-area 7b extends starting from the end 7c in a clockwise direction, with a progressively decreasing width up to an end tip 7e.

The first optical filter 7 is mounted so that it can rotate about the axis 4 of the dial and moves together with the indicator needle 3. Said result can be obtained either by means of a mechanical connection (not visible in the drawings) between the body of the filter 7 and the indicator needle 3, or, alternatively, by connecting the optical filter 7 to an electrical actuator of any known type, for example an electric motor, which is controlled in position by electronic control means in synchronism with the indicator needle 3.

The second optical filter 8 has a flat-ring conformation similar to that of the filter 7 and is divided into two sub-areas 8a, 8b, one of which is completely transmissive and the other (black in the drawing) is opaque so as to function as shutter. In a way similar to the sub-areas 7a, 7b, the sub-areas 8a, 8b have a spiral conformation with a progressively decreasing width, respectively in a counterclockwise direction and in a clockwise direction, starting from a point 8c in which their wider ends are adjacent.

The two annuli constituting the two filters 7, 8 have a radius and width that is substantially the same when viewed in the direction of the axis of rotation 4 of the indicator needle 3.

The second optical filter 8 is controlled in rotation by means of a mechanical transmission of any type (not illustrated) by an electrical actuator (not illustrated either) of any suitable type, for example by an electric motor, which is controlled by electronic control means (not illustrated in the drawings) in such a way that the point 8c that separates the two sub-areas 8a, 8b always sets itself in the angular position corresponding to the point of the graduated scale 5 (FIG. 1) that indicates the value of the cruise speed set by the driver by means of the adaptive cruise-control system with which the motor vehicle is provided.

All the parts described above that are not illustrated in the annexed plate of drawings have been omitted from the drawings in so far as they can be made in any known way, in so far as, taken in themselves, they do not fall within the scope of the present invention, and finally also in so far as their elimination from the drawings renders the latter more readily and easily understandable.

Set above the two optical filters 7, 8 is an opaque mask 9, which can form an integral part of the surface 2 (FIG. 1) of the instrument panel, made in which is a slit 10 (or alternatively a succession of holes set at a distance apart from one another). The slit 10 has the shape, of a spiral, substantially centred on the axis 4 of the dial, with an end 10a located in a position corresponding to the point "0 km/h" of the graduated scale 5, and the opposite end 10b located in a position corresponding to the maximum speed that can be set with the adaptive cruise-control system. Alternatively (FIG. 7), the slit 10 is shaped like the arc of a circumference, and set in a position corresponding thereto, in the non-filtering bottom part 9 of the aforesaid mask, is a light guide G made of transparent material designed to collect the light leaving said second optical filter 8 and transfer it onto said slit 10.

Operation of the indicating instrument illustrated in FIGS. 2-7 is described in what follows.

In the condition where the actual speed is zero and the cruise speed is set at zero, the speed indicator indicates "0 km/h", and the point of transition 7c between the green sub-area 7a and the red sub-area 7b of the optical filter 7 (which corresponds always to the position of the indicator needle 3) is set in the angular position corresponding to "0 km/h". Also the line 8c of transition between the transmissive sub-area 8a and the opaque sub-area 8b of the optical filter 8 is set in the angular position corresponding to "0 km/h". In said condition, the light emitted by the underlying light source is filtered by the first optical filter 7, but is then blocked by the opaque sub-area 8b and by the mask 9, since the slit 10 of the latter is totally superimposed on the sub-area 8b. In this way, the area of the surface 2 surrounding the square 1 remains completely dark.

If the driver sets a given cruise speed by means of the adaptive cruise-control system with which the motor vehicle is provided, the optical filter 8 is rotated about the axis 4 in such a way that the line of transition 8c comes to be in the angular position corresponding to the value of the cruise speed set on the graduated scale 5 (position 6a in FIG. 1). In this way, the light emitted by the underlying source is filtered by the optical filter 7 and only partly blocked by the optical filter 8. In fact, the transmissive sub-area 8a of the filter 8 in the aforesaid condition is superimposed on the red sub-area 7b of the first optical filter 7 as far as the angular position 6a, beyond which the opaque sub-area 8b will prevent passage of light. In this way, an entirely red arc of light 6 (FIG. 1) will be displayed, extending from the point corresponding to "0 km/h" up to the point corresponding to the cruise speed set.

In the aforesaid condition, i.e., after a given value of cruise speed has been set, if the motor vehicle is advancing at a non-zero speed lower than the cruise speed, the optical filter remains in the position specified above (which is determined by the set cruise-speed value), whilst the optical filter 7 rotates maintaining the transition area 7c constantly in the same angular position as that of the speed-indicating pointer 3. In this way, below the transmissive sub-area 8a there will come to be positioned both the red sub-area 7b, for indicating the arc comprised between the actual speed and the cruise speed set, and the green sub-area 7a, for indicating the arc comprised between "0 km/h" and the actual speed. In other words, an arc of light divided into two sectors 6b, 6c, one green and the other red, will be displayed, as represented in FIG. 1.

If the actual speed of the motor vehicle exceeds the cruise speed set, the position of the indicator needle 3, and consequently of the area of transition 7c between the sub-areas 7a, 7b of the first optical filter 7, exceeds the position 6a corresponding to the cruise speed set so that the entire arc displayed will appear completely green.

The slit 10 is spiral-shaped because, when the cruise speed set is the maximum one that can be reached and the actual speed of the motor vehicle is zero, the slit 10 must come to be in any case superimposed only on the red sub-area 7b of the first optical filter 7 and because, when both the cruise speed set and the actual speed are the maximum that can be reached, the slit 10, or the equivalent succession of points, must be always superimposed on the green sub-area 7a of the first optical filter 7.

As has already been mentioned, in the embodiment of FIG. 7, which is preferred, the slit 10, or the equivalent succession of points, is shaped like the arc of a circumference, and set in a position corresponding to said slit 10 is a light guide G adjacent to the opaque mask 9. The light guide G extends from the opaque mask 9 in the direction of the underlying first filter 7 and has the side adjacent to the opaque mask 9 of a shape substantially coinciding with that of the slit 10, or with the equivalent succession of points, that is shaped like the arc of a circumference, and the opposite side, close to said first filter 7, that is spiral-shaped. The light guide is thus shaped because, when the cruise speed set is the maximum that can be reached and the actual speed of the motor vehicle is zero, the side of said light guide G close to said filter 7 must be in any case superimposed only on the sub-area 7b of said first optical filter 7 and because, when both the cruise speed set and the actual speed are the maximum that can be reached, the side of said light guide G close to said filter 7 must be always superimposed on the sub-area 7a of the first optical filter 7.

As may be seen, the indicating instrument according to the invention enables the aims to be achieved of an effective display of the cruise speed set with a system that is almost entirely of a mechanical type, and in any case without any dedicated light sources.

Of course, without prejudice to the principle of the invention, the details of construction and the embodiments may vary widely with respect to what is described and illustrated herein purely by way of example, without thereby departing from the scope of the present invention.

For example, the optical filters could have the shape of a circular sector, instead of the flat-ring shape of an annulus type.

The invention claimed is:

1. A speed-indicating instrument for a motor vehicle provided with a cruise-control system, said instrument comprising:
   a dial provided with a window extending circumferentially along at least part of the periphery of the dial and also provided with a speed-indicating pointer co-operating with a graduated scale extending circumferentially along at least part of the periphery of the dial; and
   a device for displaying, in a position adjacent to said graduated scale an arc of light made up of two contiguous arcs of different colour, either continuous or dashed, substantially concentric with the dial, having an end in a position corresponding to the value on the graduated scale of the cruise speed set by means of the cruise-control system, and having the line of separation between said two arcs of a different colour set in a position corresponding to the current speed of the motor vehicle,
   said speed-indicating instrument being characterized in that the aforesaid device for displaying the arc of light comprises a first optical filter and a second optical filter set on top of the first optical filter, the two filters being backlighted, the second optical filter being controlled in angular position about the centre of the dial as a function of the value set of the cruise speed, and the first optical filter being controlled in angular position about the centre of the dial as a function of the current value of the speed of the motor vehicle,
   in that both of the filters have the shape of an annulus, with a radius and width that are substantially the same as one another, in that the second optical filter has two sub-areas which are one transmissive and the other opaque, these two sub-areas extending in opposite directions along the circumference of the optical filter, starting from a point of transition the angular position of said second optical filter being controlled in such a way that said point of transition between the two sub-areas is always in a position corresponding to the point of the graduated scale that indicates the value set of the cruise speed, and
   in that the aforesaid first optical filter set below the second optical filter has two sub-areas of different colour and/or transmissivity extending in opposite directions starting from a point of transition, said first optical filter being controlled in position in such a way that the aforesaid point of transition between the two sub-areas of the first optical filter is always in a position corresponding to the point of the graduated scale that indicates the current speed of the vehicle, and
   wherein both the aforesaid first optical filter and the aforesaid second optical filter have their two sub-areas that extend starting from the respective point of transition in opposite directions with a progressively decreasing width so as to define two spiral-shaped portions arranged within one another; said display device further comprising a non-filtering mask superimposed on the two optical filters and having a slit extending substantially in a circumferential direction around the centre of the dial for an angular range at least corresponding to the angular range of maximum variation of the cruise speed set on the graduated scale.

2. The indicating instrument according to claim 1, wherein the aforesaid slit is spiral-shaped.

3. The indicating instrument according to claim 1, wherein the aforesaid slit is shaped like the arc of a circumference, and located in a position corresponding thereto, in the bottom part of the aforesaid non-filtering mask, is a light guide made of transparent material designed to collect the light leaving said second optical filter and transfer it onto said slit.

* * * * *